Nov. 20, 1928.

E. KASSNER 1,692,411

CHECK ISSUING AND ADDING MACHINE

Filed May 26, 1923     6 Sheets-Sheet 2

Fig. 2.

Inventor

Nov. 20, 1928.  E. KASSNER  1,692,411
CHECK ISSUING AND ADDING MACHINE
Filed May 26, 1923   6 Sheets-Sheet 4

Inventor,
Ernst Kassner

Nov. 20, 1928.

E. KASSNER 1,692,411

CHECK ISSUING AND ADDING MACHINE

Filed May 26, 1923   6 Sheets-Sheet 6

Inventor:
Ernst Kassner

Patented Nov. 20, 1928.

1,692,411

UNITED STATES PATENT OFFICE.

ERNST KASSNER, OF BERLIN, GERMANY.

CHECK ISSUING AND ADDING MACHINE.

Application filed May 26, 1923, Serial No. 641,650, and in Germany March 11, 1921.

My present invention relates to check issuing and adding machines and has for its object to provide a portable type of such a machine, which may be used as an adding machine for book-keeping and the like purposes, and as a cash register, alternately; its feature of being portable enables the operator to carry the machine from office into the sale room and vice versa. Its portability feature being mainly due to simplified mechanical constructions and improved mechanical movements, which will be described hereinafter with reference to the drawings accompanying this application, and claimed in the claims appended. And incidentally with this main object, the machine according to the present invention contains some new features which will be found useful in other machines of the class to which the object of this application appertains, and which new features will also be described hereinafter and finally claimed.

The machine illustrated is provided with a plurality of banks of amount keys 1 of which there are nine in each bank, and which are slidably mounted in a frame 4, $4^a$ and retained in their inoperative position by means of springs not especially shown. The keys of each blank cooperate with a lever 3 oscillatorily mounted upon a shaft 5 and provided with an abutment 21. A spring $3^a$ tends to retain the lever 3 in its inoperative position, and the upper edge of the lever 3 is serrated to offer each key 1 a rectangular contacting face when said key is in its operative position. According to the different numeral value of each key the lever 3 is imparted a differential movement, in accordance to which the abutment 21 may occupy nine different positions designated in Fig. 1 by the Figures 1 to 9 and which correspond to nine stepwise positioned serrations $1^a$, $2^a$, $3^a$, $4^a$, $5^a$, $6^a$, $7^a$, $8^a$, $9^a$, in a type carrier 14 which is oscillatorily mounted on a shaft 11 and connected to a spring 20 by means of connecting rods 16 and 17 and a lever 18 mounted on a shaft 19. However, the oscillatory movement of each type carrier is controlled by means of a catch 12 fixedly secured upon the shaft 11. The latter is connected by means of a crank arm 10, a connecting rod 9, another crank arm 8 to a main operating shaft 7. When the latter is caused to revolve, the revolving movement is imparted to the shaft 11 and the type carrier 14 is then allowed to yield to the pull of the spring 20 until the abutment 21 stops the type carrier in a position that corresponds to the key 1 depressed previously to the revolving movement of the main shaft 7.

The novel type carrier according to my present invention is composed of two diametrically extending arms, the upper one carrying the serrations $1^a$, $2^a$, $3^a$, $4^a$, $5^a$ to $9^a$ and the lower one the printing types 0, 1, 2, 3, 4, 5, 6, 7, 8, and 9, which are directly cut into the circumferential face of said lower segment arm.

Each type carrier is connected to a toothed segment 23 by means of said connecting rod 16 and pivots 15 and 22. The toothed segments 23 are revolubly mounted upon a shaft 24, and each cooperates with a set of counting wheels 25, 26, 28, mounted upon shafts 30, and 29, respectively. The wheel 28 carries on its circumference indication numbers, and the number set up by a depression of a key 1 appears below the sight hole 61. In one direction of rotation the indication wheel 28 is coupled with the pinion 26 by means of a spring actuated pawl 27, while in the opposite direction of rotation the indication wheel is free to revolve and may, then, be returned to zero position by means of any appropriate zero restoring mechanism. The intervening gears 25 are mounted on a shaft 30 which forms part of a frame 52, 53, (Fig. 2) oscillatorily mounted on pivots 54, 54, of the machine casing. The frame 52, 53 carries another shaft 24 on which are mounted said segments 23 so as to mesh with their respective intervening gears. The oscillation movements of the frame 52, 53, are controlled by means of a hand lever 129 (Fig. 1) disposed on a pivot outside of the machine casing and engaging by means of a slotted arm 129$^a$ a pin 129$^b$ secured on the frame part 52. When said hand lever 129 is being moved into the position indicated in Fig. 1 by dotted lines, the frame 52, 53 is thereby oscillated and the intervening wheels 25 are caused to engage another set of counting wheels 55, 64; the indicating wheel 64 being coupled to the pinion 55 in one direction by means of a spring actuated pawl 63. The indication numbers of the wheel 64 are made visible through the sight opening 65.

Between the indication numbers of the counting wheel 28 are provided radially extending recesses 28$^a$ of different radial depth. A hooked lever 57 mounted upon the shaft 5 and connected to a spring 59, is adapted to engage into these recesses with its hooked portion 60. In the position shown in Fig. 1, the lever 57 is being locked by means of a bar 56 extending between, and carried by the frame parts 52 and 53 and engaging a projection 58 of the lever 57. The latter is provided with a lug 62 engaging the adjoining key actuated lever 3. Now, when the hand lever 129 is being moved into the position indicated in Fig. 1 by dotted lines, the locking bar 56 withdraws from the projection 58, and the lever 57 is free to allow its hook 60 to engage into that recess which is diametrically disposed to the number appearing in the sight hole 61. And the depth of this particular recess has such a relation to the number below the sight hole that thereby the lever 3 is moved by the spring 59 into the same position into which it had been swung by a depression of that key 1 which corresponds in its numerical value to the number appearing in the sight hole. When, thereafter, a revolving movement is imparted to the main shaft 7, the type carrier 14 is stopped in the position corresponding to the position of the indication wheel, and the value of this latter position is transferred by means of the segment 23 and intervening wheel 25 to the pinion 55 and the indication wheel 64 of the second counting mechanism, which is provided to accumulate the totals produced in the first counting mechanism. The latter will hereafter be referred to as the items counting mechanism, while the second counting mechanism will be called the totals accumulating mechanism.

It will be understood that the counting and type carrier operating mechanism described above are provided in the machine for each decimal bank of keys.

When an item is set up in the machine and, thereupon, the main operating shaft revolved by means of the crank 6, the printing of the types is performed previous to the completion of the stroke of the crank, by means of the following mechanism.

Figure 1:
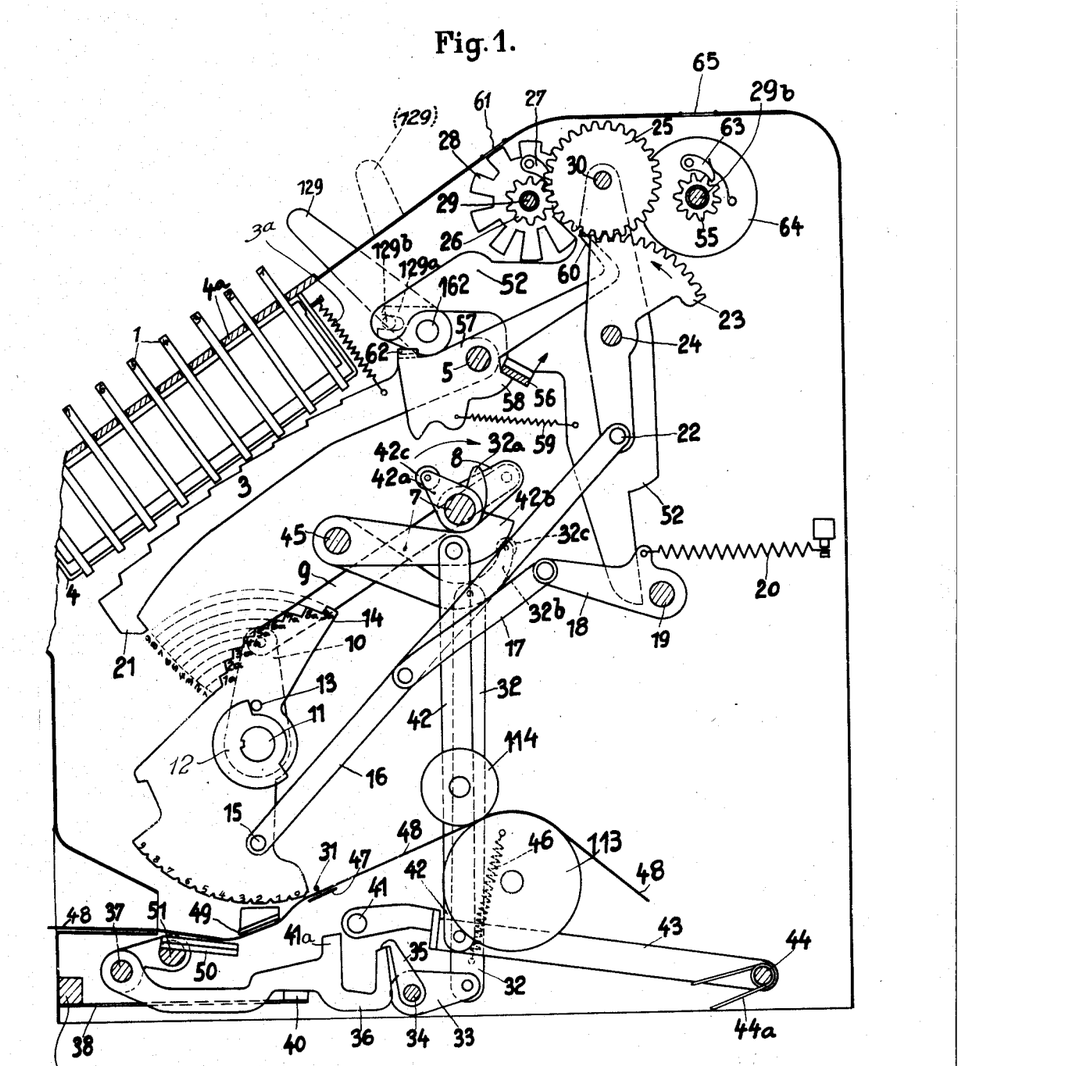
Fig. 1 is a side section showing the associated mechanical parts of one denominational order and the main actuating members.
Figure 2:
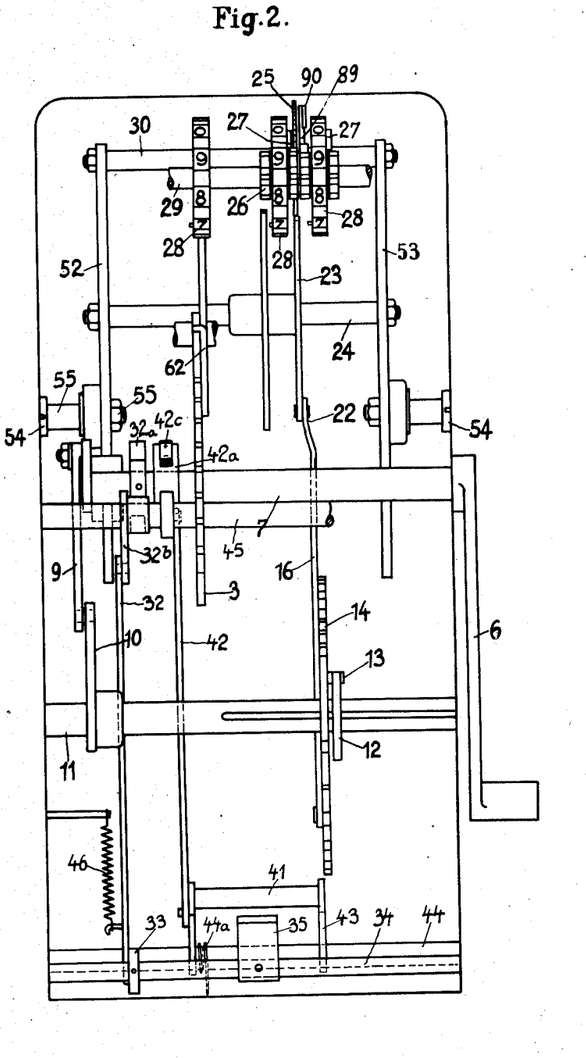
Fig. 2 is a section at right angle to the section shown in Fig. 1, and showing the parts of Figure 1 as applied in different denominational orders, some of the associated parts being omitted for the sake of clearness.

In Fig. 1 the printing position is designated by the numeral 31. Opposite to this printing position is arranged a hammer 41$^a$ carried on an arm 36 which is pivoted on a shaft 37 and acted upon by a spring 38 and a contacting plate 40. The spring 38 is secured on a transverse bar 39. The hammer is retained in its inoperative position by means of a latch 35 which is secured on a shaft 34. This shaft is connected by means of a crank arm 33 to a rod 32, which is drawn upwards by a spring 46 and pivoted to an arm 32$^b$ provided with a roll 32$^c$. Upon the main shaft 7 is secured a cam 32$^a$ which on each revolution of the shaft 7 depresses once the rod 32 and thus causes the latch 35 to release the hammer. While the latch 35 is released at about the completion of one half revolution of the main shaft 7, there is provided another cam member 42$^a$ on said shaft for restoring the hammer 36 into its initial position during the second half revolution. The cam member 42$^a$ controls an arm 42$^b$ pivoted at 45 and connected to a rod 42 which is joined to an arm 43 pivoted at 44 and carrying a restoring bar 41 disposed to push the lever 36 back into engagement with the latch 35.

To render to printing types visible upon a strip of paper 48, an inking ribbon 47 is placed between the hammer 41$^a$ and the paper strip 48, said ribbon extending transversely through the machine.

Figure 3:
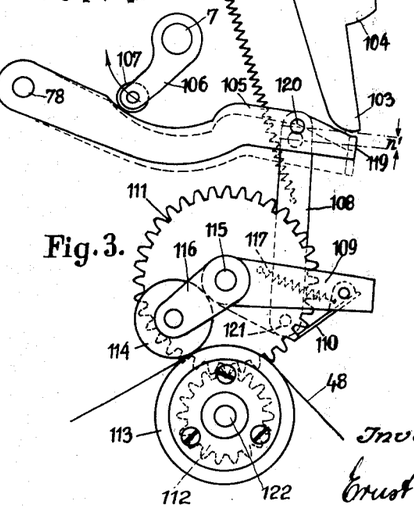
Fig. 3 shows the main parts of the check strip feeding device in a side view.
Figures 4, 10, 13, 14, 15:
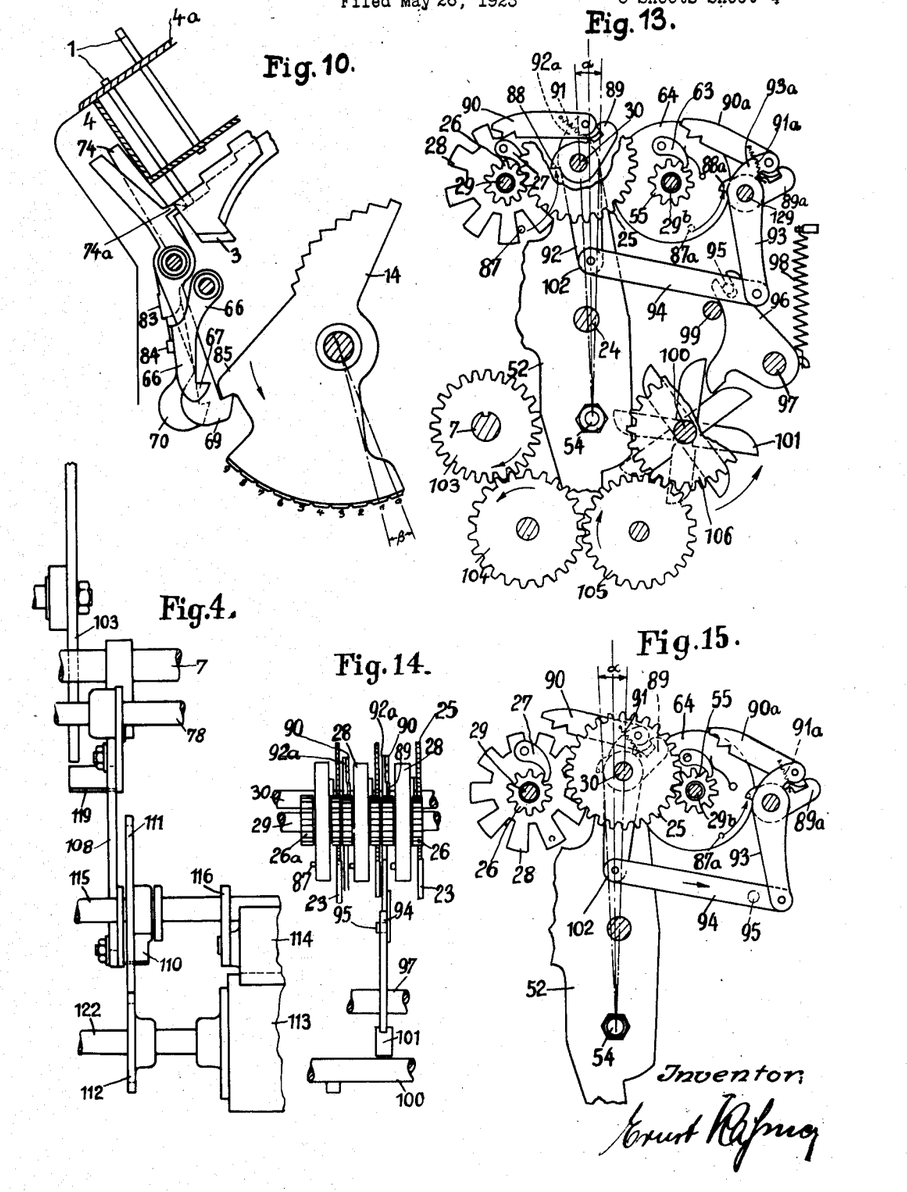
Fig. 4 is a front view to Fig. 3.
Fig. 10 shows the parts of Fig. 8 in another relative position and the type carrier with its zero character in printing position.
Fig. 13 illustrates, in a side view, a transfer device for the counting mechanism.
Fig. 14 is a front view of parts illustrated in Fig. 13.
Figure 15 shows some of the parts of Fig. 13 in another relative position.
Figures 5, 6, 7:
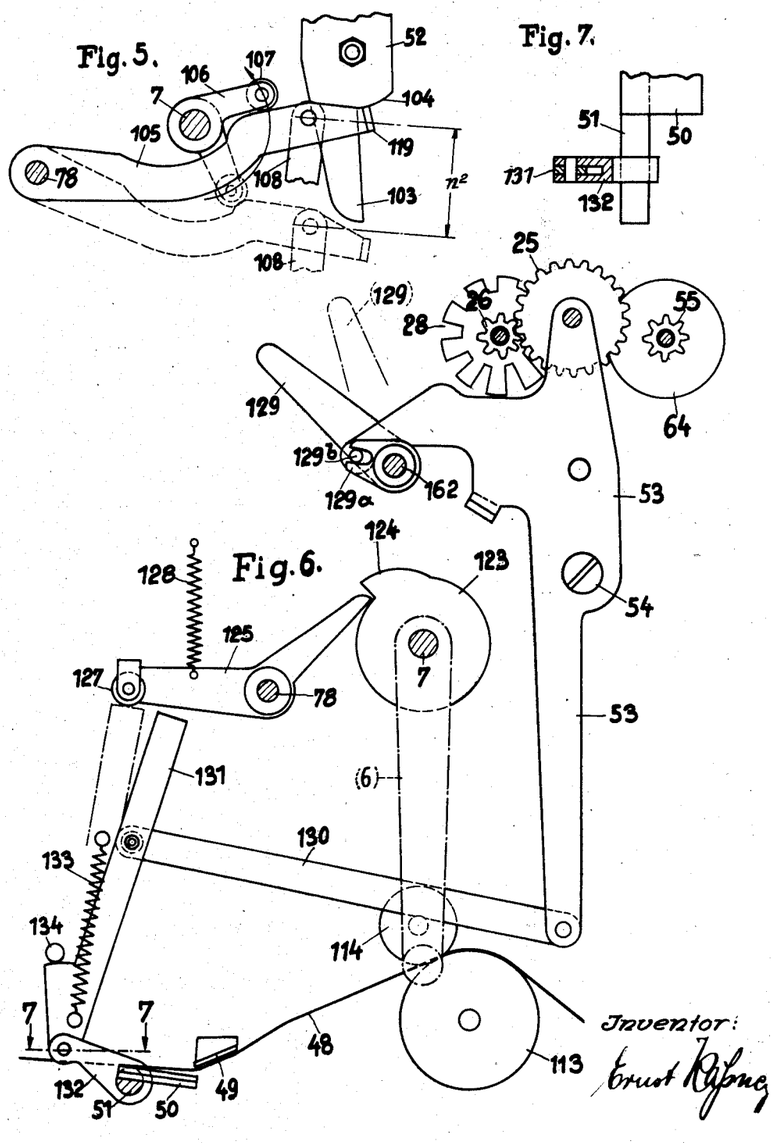
Fig. 5 shows some parts of Fig. 3 in another relative position.
Fig. 6 shows, in a side view, the check strip severing device.
Fig. 7 is a horizontal secton on the line 7—7 in Fig. 6.

The feed of the paper strip 48 is actuated from the main shaft 7 by means of a mechanism shown in Figures 3, 4, and 5. A cam 106 of the main shaft 7 cooperates by means of a roll 107 with a lever 105 pivoted at 78 and attached by means of a rod 108 to a forked arm 109 between the fork proper of this arm is disposed a toothed wheel 111. The latter is together with said forked arm revolubly mounted upon a shaft 115 (see Fig. 4). The forked arm 109 is arranged on both sides of the cog wheel 111, and the portion to which the rod 108 is pivoted by the pin 121 is illustrated in dotted lines in Fig. 3 of the drawings, and in full lines in Fig. 4. The rod 108 is subjected to the action of a spring 118, and said forked arm 109 carries a pawl 110 which under the action of a spring 117 is maintained in engagement with said toothed wheel 111 which is advanced for one step when the cam member causes the lever 105 to move into the position indicated in dotted lines in Fig. 3. During the return movement of the lever 105 under the action of the spring 118, the latch slides over the teeth of the wheel 111 without causing the latter to partake of the movement. The gear wheel 111 meshes with a gear wheel 112 which is secured with a feed roller 113 on a shaft 122 and with the latter cooperates another feed roller 114 mounted on an arm 116.

The extent $n^1$ (Fig. 3) of the rocking movement of the lever 105 is controlled through the oscillatory position of the frame 52, 53. In Fig. 3 the frame part 52 is shown in the position in which the intervening gear 25 is in engagement with the items accumulating mechanism. In this position the abutment 103 of the frame part 52 limits the upward stroke of the lever 105 to the extent of $n^1$ in Fig. 3. When the frame 52, 53 is in its other extreme position in which the intervening wheel 25 meshes with the pinion 55, the upward stroke of lever 105 and its lug 119 is limited by the abutment 104 as shown in Fig. 5 and the extent of the upward stroke is equal to $n^2$. In this case the advance of the feeding roller pair 113, 114 and the paper strip 48 is increased in the same relation, with the effect that the total is printed at a distance from the listed items.

After the total of the listed items is printed on the strip of paper, the latter is ready to be separated and issued, which is performed by the mechanism, illustrated in Figs. 6 and 7.

The strip of paper 48 passes through a stationary knife 49 and a movable knife 50 fixedly secured on a shaft 51 adapted to be oscillated by means of an arm 132 which is attached to a push bar 131. The latter is drawn upwards by means of a spring 133 and its upward stroke is limited by means of a stationary stop 134. Said push bar 131 is connected by means of a rod 130 to the frame part 53 and occupies the position shown in Fig. 6 in full lines when the frame 52, 53 is not caused to engage the second or totals accumulating mechanism. In this case the bent lever 125 mounted on a pivot 78 and attached to the end of a spring 128 cannot act upon said push bar when the cam 123, 124 fixedly secured upon the main shaft 7 causes the roll 127 of the bent lever 125 to perform a downward directed stroke. When the frame 52, 53 is rocked by means of the hand lever 129 into its other extreme position in which the main operating shaft causes the total of previously accumulated items to be accumulated into the second counting mechanism, the push bar 131, then, occupies the position indicated in Fig. 6 by dash-and-dotted lines and the main operating shaft causes the knife 50 to swing upwards whereby the strip of paper is severed. The action of the cam 123, 124 is so timed that the cutting of the strip takes place towards the conclusion of the revolving movement of the main operating shaft 7.

My novel machine also prints zero characters by means of a mechanism which causes the type carriers of the lower decimal banks to advance their zero characters into printing position when any key of a higher decimal bank is being depressed. The mechanism comprises the following members.

Figure 8:
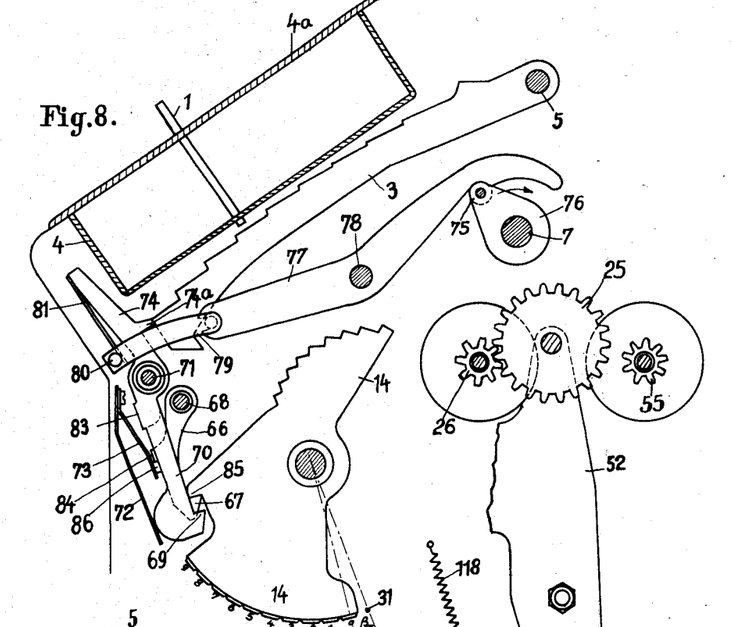
Fig. 8 shows, in a side view, the device for maintaining the zero character of the type carrier out of printing position.
Figure 9:
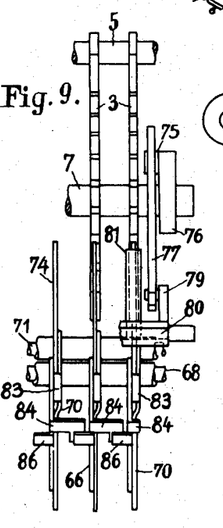
Fig. 9 is a front view to Fig. 8 and shows the relative connections between the parts of adjoining denominational orders.

When the type carrier is in inoperative position, the zero character is being retained out of printing position for amount $\beta$ in Fig. 8 which equals the distance between the latches 67 and 69 (see Fig. 8, 9 and 10). The type carrier 14 is provided with a projection 85 adapted to cooperate with said latches 67 and 69 which are provided on arms 66 and 70 mounted respectively on shafts 68 and 71. A spring 73 acts on the latch arm 66, and another spring 72 on the latch arm 70. On said shaft 71 is mounted another arm 74 with a latch 74* disposed so as to engage the key operated lever 3 as soon as the latter is being moved out of its inoperative or initial position. A spring 81 is fixedly secured upon a shaft 80 and may be caused to act upon said latch arm 74 when, for that purpose, the shaft 80 is being revolved somewhat. An oppositely extending arm of the latch arm 74 contacts with a laterally projecting lug 83 of the latch arm 70. And since the power of spring 81 predominates over the spring 72, the latch arm 70 will be swung rearward when under the action of the spring 81 the latch arm 74 moves towards the key guiding frame 4. Each latch arm 70 is coupled in one direction with the latch arm 66 of the same denominational order by means of a laterally projecting lug 84 (see Fig. 9) which latter, however, is of such a length as to also engage another lug 86 of the latch arm 66 of the next lower denominational order. By means of these interengaging lugs 84 and 86 all the latch arms 66 are so coupled to each other that all latch arms 66 of the lower denominational orders are caused to swing out of operative position when any latch arm 66 of a higher denominational order is moved backwards along with a latch arm 70.

Ordinarily, the spring 81 does not exert any pressure upon the latch arm 74, so that no release of the latches takes place when the keys 1 are operated. However, the shaft 80 is connected to the main shaft 7 by means of a lever 79 which is connected through a pin and slot connection, to a double armed lever 77 pivoted at 78. A cam 75 of a crank arm 76 of the main operating shaft is disposed to swing the rearwardly extending arm of the lever 77 upwards at the beginning of the revolving movement of the shaft 7, and, thereby, causes the lever arm 79 to swing downwards. This movement of the lever 79 turns the shaft 80 and thereby tensions the spring 81, and, now, all the latch arms 74 released can yield to the pressure of their respective springs 81 and impart their oscillatory movement to the latch arms 70 and 66 coupled to each other by means of the lugs above described. When, thus, any latch arm 70 is swung backward the type carrier belonging to the respective latch arm is released from the latch 67 and can now move into the position determined by the key 1 depressed. Simultaneously all latches 67 of the lower denominational orders are withdrawn and their respective type carriers can advance for the amount (Fig. 8) to bring the zero characters into printing position in which said type carriers are caught by the respective latches 69 (see Fig. 10).

Figures 11, 12, 16, 17:
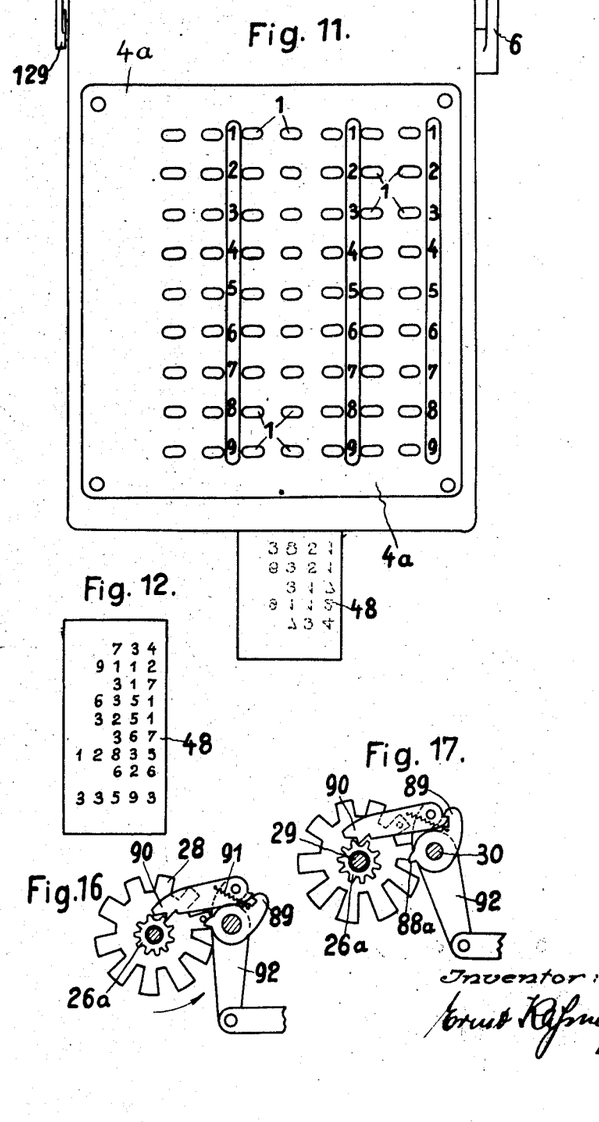
Fig. 11 is a plan view of the key board.
Fig. 12 shows a check as issued by the machine according to the present invention.
Figs. 16 and 17 are details of some of the parts shown in Fig. 15, and illustrate different relative positions of these parts.

In all machines hitherto known, the paper strip had to be moved away from the place of the operator to enable the machine to print the items in the same order as they are set up on the key board, and to place the total at the foot of the column of items. According to the present invention, the checks show the proper order of items and totals and are issued immediately below the key board and in front of the operator, and this is obtained by making the raised types on the type carrier of the form of the characters themselves as ordinarily seen on paper, and the printed characters are rendered readable on the back of the paper strip by means of the inking ribbon 4$^f$ situated between hammer 41$^a$ and type carrier 14. Fig. 11 shows the paper strip issuing below the key board and with the items and total printed on its back. If the severed check is turned, it looks like the check illustrated in Fig. 12. As a matter of course, any additional characters may be printed opposite to each item or the total or on any place of the check to identify the salesman who sold the items listed on said check.

The present invention also comprises a transfer mechanism for the counting wheels, which is illustrated in Figures 13, 14, and 15. The transfer movement is produced by cams 101 fixedly secured on a shaft 100. For each denominational order of counting mechanism there is provided a separate cam 101, and the series of radially projecting cams are distributed over the circumference of the shaft 100 in order to actuate the transfer mechanism of the higher denominational orders one after the other.

Each cam cooperates with a cranked lever 96 fulcrumed at 97 and connected by means of a pin and slot connection to a rod 94 which interconnects two parallel arms 92, and 93. The cranked lever 96 is under the action of a spring 98, and the oscillatory movement is limited in one direction by a stationary stop 99 and controlled in the opposite direction by the cam 101 cooperating therewith. Any oscillatory movement of the cranked lever 96 is equally imparted to the arms 92 and 93, which are mounted on said shaft 30, and on a stationary shaft 129, respectively. The arms 92 and 93 are provided with extensions 92$^x$, and 93$^a$, respectively, on which are pivotally mounted the carrying members 90 and 90$^x$, respectively.

Said carrying member 90 is adapted to engage said pinion 26$^a$ fixedly secured on a sleeve 29$^a$, on which is fixed the indicating wheel 28. Between said pinion 26$^a$ and said wheel 28 is loosely mounted a pinion 26 adapted to be coupled with the latter in one direction of rotation by means of a pawl 27 carried by said indicating wheel. Said loosely mounted pinion 26 is disposed to mesh with said intervening wheel 25 which is actuated by said toothed segment 23 as above described. When said pinion 26$^a$ is advanced for one unit, the pinion 26 does not participate in this movement, since the pawl 27 then slides over its teeth without actuating said pinion 26. Ordinarily, the carrying member 90 is held out of engagement with said pinion 26$^a$ by means of a pawl 89 loosely mounted on said shaft 30 and subjected to the action of a spring 91 that tends to maintain said carrying member 90 in engagement with said pawl 29. The latter is provided with a catch 28 that projects laterally into the path of a stop 87 of the indicating wheel of the preceding denominational order, so that when said indicating wheel passes the nine said stop 87 swings said pawl out of engagement with said carrying member 91, which thereupon drops into engagement with said pinion 26$^x$ (see Figure 16) to advance the same for one unit when the next carrying impulse is transmitted to said carrying member from the respective cam 101 over the members 96, 94, and 92, 92$^a$. The angular relation of the pawl 89 to the carrying member 91 is such that at the conclusion of the carrying movement the latch engagement between both parts is automatically restored as illustrated in Fig. 17, and the carrying member 91 lifted out of contact with the pinion 26$^x$ on the return of the carrying mechanism to its initial position which is restored by the action of the springs 98.

For the indicating wheels 64 are provided similar carrying members, namely, arm 93, with opposite extension 93$^a$, a pawl 89$^x$ loosely mounted on said shaft 129, a spring 91$^a$, tending to maintain the pawl 89$^a$ in engagement with a carrying member 90$^x$, and a dog 88$^a$ on said pawl 89$^a$ and laterally projecting into the path of a stop 87$^a$ of the indicating wheel 64. The pinion 55 is coupled in one direction of rotation with said indicating wheel by means of a pawl 63. In front of said pinion 55 is secured on a sleeve 29$^a$ another pinion not especially shown which is fixedly coupled with said indicating wheel 64 and adapted to cooperate with said carrying member 90ª, in the manner and for the purpose as above described with relation to the carrying member 91 and the pinion 26ª. The mechanism for printing the totals is shown and described in my application No. 159,770, and as such mechanism does not constitute a portion of the present invention, it has been omitted from the drawings for clearness of illustration.

As may be seen from Figures 13 and 15, the pivotal connection between the rod 94 and the arm 92 is disposed within the bisecting line of the angle α about which the shaft 30 oscillates, when the items accumulated in the first counting mechanism are to be transferred into the totals accumulating mechanism. Thus, when the frame parts 52, 53, carrying the shaft 30, are oscillated about the pins 54, 54, no shifting movement is imparted to the connecting rod 94 which receives the carrying impulse at each revolution of the main operating shaft 7 over the intermediate gears 103, 104, 105, and 106.

The operation of the machine as disclosed in this application is as follows.

The numbers of an item are set up in the machine by depressing corresponding keys 1 on the key board (Fig. 10). Thereupon, the main operating shaft 7 is revolved by means of the handle 6. During the revolution of the main shaft 7, the following operations take place within the machine: moving the type carriers 14 until they are stopped by the setting up levers 3, and simultaneously adjusting the item counting mechanism to the item set up on the key board; thereafter releasing the hammers 41ª by the cam 32ª and restoring said hammers to their inoperative position by means of the cam 42ᵇ; feeding the strip of paper 48 for the amount $n^1$ (Fig. 6) and returning the type carriers into their initial position, as shown in Fig. 1. The second and all further items are then set up and printed in the same manner. These items are accumulated in the first counting mechanism and the total of any number of items appears below the show opening 61. If, finally, the total of the items printed on the strip of paper 48 is to be printed, too, and to be transferred into the second or totals accumulating mechanism for the purpose of being retained in the machine, all that is required to produce these effects is to operate the lever 129 and impart another revolving movement to the main operating shaft 7 by means of the handle 6. While the lever 129 is being shifted into the position shown in dotted lines in Fig. 1, the setting up levers 3 are automatically moved into those positions that would be obtained by depressing, on the key board, those keys 1 the value of which corresponds to the total shown below the sight aperture 61. Simultaneously, the intermediate gears 25 are shifted to mesh with the pinions 55 of the totals accumulating mechanism. On starting the revolving movement of the main handle 6 the adjusting, printing, and paper strip feeding movements, take place the same as when an item is to be recorded. However, the previous shifting of the frame 52, 53, also moved the push bar 131 below the roller 127 of the cranked lever 125 (see Fig. 9) and the paper feeding lever 105 to the distance $n^2$ as shown in Fig. 8, so that this time the strip of paper 48 is fed a correspondingly greater distance to cause the total to be printed removed from the items, and towards the completion of the revolution of the main handle the cam 124 (Fig. 9) imparts a rocking movement to the shaft 51 and the movable knife 50, whereby the strip of paper 48 is severed, and the check as shown in Fig. 12 issues at the front of the machine and below the key board. It will, thus, be understood that the totals accumulating mechanism must be operated before a check can be severed from the strip and issue. If the check is to bear but one item, the member 129 must be operated before the main operating handle is rotated. This feature ensures that any single item will be accumulated in the machine, namely, in the totals accumulating mechanism, which is, ordinarily, not restored to zero before the conclusion of a day's sale work or any other period of time as may be desired. Such zero restoring means are not shown in the drawings since any approved form of such means may be adopted for that purpose.

Having thus described the constructional parts of my novel machine, I am aware that the mechanical movements embodying my invention may be secured by means different in construction, without thereby departing from the spirit and scope of the invention as disclosed in this application and claimed in the claims appended.

What I claim, and desire to secure by Letters Patent of the United States, is:—

1. In a machine of the class described, the combination of a bank of keys arranged in a row, a setting up lever extending longitudinally of the row of keys and pivoted adjacent to one end of the row and provided adjacent the other end of the row with a catch, said setting up lever having a step-like formation presenting a series of faces arranged to be engaged by the keys for moving the setting up lever to different positions, and a pivoted member provided with a step-like formation presenting a series of faces arranged to be engaged by the catch on the setting up lever in the different positions thereof, whereby the amount of movement of the said member is controlled by and corresponds to the movement of the key actuated setting up lever.

2. In a machine of the class described, the combination of a bank of keys arranged in a row, a setting up lever located beneath and extending longitudinally of the row of keys and pivoted adjacent one end of the row and provided adjacent the other end of the row with a catch, said setting up lever having a step-like formation presenting a series of faces arranged to be engaged by the keys for moving the setting up lever to different positions, and a pivoted member associated with the setting up lever and provided with a step-like formation presenting a series of faces arranged to be engaged by the catch of the setting up lever, whereby the amount of movement of the said member is controlled by and corresponds to the movement of the key actuated setting up lever.

3. In a machine of the class described, the combination of a bank of keys arranged in a row, a setting up lever associated with the bank of keys and pivoted adjacent one end of the said row of keys and provided adjacent the other end with a catch, said setting up lever having a step-like formation presenting a series of faces arranged to be engaged by the keys for moving the setting up lever to different positions, and a pivoted member arranged to swing in an arc intersecting the arc of movement of the setting up lever and having a step-like formation presenting a series of radially and circumferentially spaced faces arranged to be engaged by the said catch in the different positions of the setting up lever, whereby the amount of movement of said lever is controlled by and corresponds to the movement of the key actuated setting up lever.

4. In a machine of the class described, the combination of a bank of keys arranged in a row, a setting up lever located beneath and extending longitudinally of the row of keys and pivoted adjacent one end of the row and provided adjacent the other end of the row with a projecting abutment forming a catch, said setting up lever being provided at its upper edge with a step-like formation presenting a series of faces located at different distances from the pivot of the lever and arranged to be engaged by the said keys for moving the lever to different positions, and a pivoted member associated with the setting up lever and provided with a step-like formation presenting a series of radially and circumferentially spaced faces arranged to be engaged by the said catch in the different positions of the setting up lever, whereby the amount of movement of the said member is controlled by the movement of the key actuated setting up lever.

ERNST KASSNER.